US007446974B2

(12) United States Patent
Deshpande et al.

(10) Patent No.: US 7,446,974 B2
(45) Date of Patent: Nov. 4, 2008

(54) ELECTRONIC COMPONENT AND TAPE HEAD HAVING A CLOSURE

(75) Inventors: Annayya P. Deshpande, San Jose, CA (US); Calvin Shyhjong Lo, Saratoga, CA (US); Kevin Thuy Luong, San Jose, CA (US); Artemio Juan Torres, Milpitas, CA (US)

(73) Assignee: International Business Machines Corporation, Armonk, NY (US)

( * ) Notice: Subject to any disclaimer, the term of this patent is extended or adjusted under 35 U.S.C. 154(b) by 517 days.

(21) Appl. No.: 11/036,148

(22) Filed: Jan. 14, 2005

(65) Prior Publication Data

US 2005/0124141 A1 Jun. 9, 2005

Related U.S. Application Data

(62) Division of application No. 10/346,033, filed on Jan. 15, 2003, now Pat. No. 6,863,061.

(51) Int. Cl.
*G11B 5/147* (2006.01)

(52) U.S. Cl. ........................................ 360/126

(58) Field of Classification Search ................. 360/126, 360/119, 121, 122, 129, 130.21, 221
See application file for complete search history.

(56) References Cited

U.S. PATENT DOCUMENTS

| | | | | |
|---|---|---|---|---|
| 5,718,615 | A | 2/1998 | Boucher et al. | 451/5 |
| 5,883,770 | A * | 3/1999 | Biskeborn et al. | 360/130.21 |
| 6,122,147 | A * | 9/2000 | Fahimi et al. | 360/221 |
| 6,404,587 | B1 * | 6/2002 | Chaug et al. | 360/119 |
| 6,646,830 | B2 * | 11/2003 | Biskeborn et al. | 360/129 |
| 6,744,594 | B2 * | 6/2004 | Denison et al. | 360/121 |
| 6,781,792 | B2 * | 8/2004 | Biskeborn | 360/129 |
| 6,885,518 | B1 * | 4/2005 | Chaug | 360/121 |
| 6,943,987 | B1 * | 9/2005 | Raymond et al. | 360/121 |
| 7,161,764 | B2 * | 1/2007 | Biskeborn et al. | 360/122 |

FOREIGN PATENT DOCUMENTS

| | | |
|---|---|---|
| JP | 60197372 | 10/1985 |
| JP | 4162647 | 6/1992 |
| JP | 4254352 | 9/1992 |
| JP | 6328433 | 11/1994 |
| JP | 2001250800 | 9/2001 |

* cited by examiner

*Primary Examiner*—Tianjie Chen
(74) *Attorney, Agent, or Firm*—Zilka-Kotab, PC

(57) ABSTRACT

An electronic component according to one embodiment comprises a portion of a row cut from a wafer; and a closure coupled to the portion of the row of the wafer towards a first edge of the portion of the row of the wafer; the portion of the row of the wafer having a bonding area positioned adjacent a second edge of the portion of the row of the wafer, the second edge of the portion of the row of the wafer being positioned opposite the first edge of the portion of the row of the wafer and along a same side thereof, wherein the bonding area includes a layer of adhesive thereon, wherein the adhesive coupled to the bonding area is spaced from the closure. Additional systems and methods are also presented.

10 Claims, 6 Drawing Sheets

ELECTRONIC COMPONENT AND TAPE HEAD HAVING A CLOSURE

RELATED APPLICATIONS

This application is a divisional of U.S. patent application Ser. No. 10/346,033, filed Jan. 15, 2003 now U.S. Pat No. 6,863,061.

FIELD OF THE INVENTION

The present invention relates to magnetic head fabrication, and more particularly, this invention relates to a method for reducing blade distortion during slicing of a wafer.

BACKGROUND OF THE INVENTION

Die separation, or dicing, by sawing is the process of cutting a thin film microelectronic substrate into its individual read/write recording devices with a rotating circular abrasive saw blade. This process has proven to be the most efficient and economical method in use today. It provides versatility in selection of depth and width (kerf) of cut, as well as selection of surface finish, and can be used to saw either partially or completely through a wafer or substrate.

Wafer dicing technology has progressed rapidly, and dicing is now a mandatory procedure in most front-end thin film packaging operations. It is used extensively for separation of die on thin film integrated circuit wafers.

Dicing thin film wafers by sawing is an abrasive machining process similar to grinding and cutoff operations that have been in use for decades. However, the size of the dicing blades used for die separation makes the process unique. Typically, the blade thickness ranges from 0.6 mils to 500 mils, and diamond particles (the hardest known material) are used as the abrasive material ingredient. Because of the diamond dicing blade's extreme fineness, compliance with a strict set of parameters is imperative, and even the slightest deviation from the norm could result in complete failure.

The diamond blade is a cutting tool in which each exposed diamond particle comprises a small cutting edge. Three basic types of dicing blades are available commercially:

Sintered Diamond Blade, in which diamond particles are fused into a soft metal such as brass or copper, or incorporated by means of a powdered metallurgical process.

Plated Diamond Blade, in which diamond particles are held in a nickel bond produced by an electroplating process.

Resinoid Diamond Blade, in which diamond particles are held in a resin bond to create a homogeneous matrix.

Thin film wafer dicing is dominated by the plated diamond blade, which has proved most successful for this application.

Increasing use of more expensive and exotic materials, coupled with the fact that they are often combined to produce multiple layers of dissimilar materials, adds further to the dicing problems. The high cost of these substrates, together with the value of the circuits fabricated on them, makes it difficult to accept anything less than high yield at the die-separation phase.

Thin film wafers are of a standardized size, and thus, the number of die that can be cut from each wafer is limited. To maximize the amount of wafer space that can be used for circuitry, and thus the die yield per wafer, the area cut away during slicing must be minimized. This can be accomplished only by using thinner blades and by elimination of yield loss due to deviation of the blade from the desired cut path.

One category of component created by thin film processing is the tape head. Many heads (such as hard disk recording heads and some tape heads) do not use closures, so they are relatively easy to slice. However, most conventional tape heads use closures. FIG. 1 depicts one such tape head 100. The head 100 consists of a pair of head portions 102, each having a closure 104 that engages the tape 106 as it passes over the head 100.

For those heads that use closures, a problem arises during slicing by state of the art methods. To maximize yield, the cut is made through the wafer 202 such that it shaves off one edge of the closure 104. See FIG. 2. Because the blade engages more material on one side of the blade than the other, the blade becomes distorted, causing the blade to stray from the desired cut path and destroy die.

Cutting the wafer along side the closure rather than through the edge of the closure is not desirable for cutting rows from the wafer because of the typically high margin of error during sawing. By moving the saw path closer to the circuitry, the blade is more likely cut into the read/write circuitry, rendering the die unusable. The only remedy under this traditional method of cutting would be to increase the size of each row on the wafer to compensate for blade deviation or to accommodate a thicker blade. Either way, the end result would be an undesirable decrease in yield.

FIG. 3 depicts a prior art attempt at reducing blade distortion. As shown, a stiffener 300 is coupled to the non-wafer-contacting portion of the blade 200 to add to the resiliency of the blade 200. While this solution does remedy blade distortion to a degree, it does not eliminate the yield loss completely, as some distortion still occurs, with the resulting deviation from the cut path and circuit destruction.

It would be desirable to achieve the aforementioned benefits using conventional, and therefore, less expensive blades. It would also be desirable to use a thinner blade to allow a higher yield per wafer. It would also be desirable to decrease the error rate caused by deviation of the blade during sawing

SUMMARY OF THE INVENTION

The present invention overcomes the drawbacks and limitations described above by providing a method and mechanism for slicing a thin film wafer to form such things as tape head components. According to the method, the thin film wafer is cut into sections. A closure is bonded to each section of the wafer. A top portion of the closure may be removed prior to slicing the section into rows. Grinding may be used to remove the top portion.

A blade is used to slice rows from each section by cutting through the closure and thin film wafer such that opposite sides of the blade engage an equal surface area of the closure. In other words, the blade fully engages the closure. The cutting width of the blade is preferably less than 150 microns, more preferably less than 100 microns, and ideally less than 75 microns.

Upon slicing, two pieces of closure material remain coupled to the row. One portion of closure material is desired and will function to engage the tape when the row is used in a tape head. The other portion of the closure material, referred to as a sliver, is removed. The sliver can be removed by lapping. The sliver can also be removed mechanically, i.e., by some physical mechanism, without removing material from the row. One example would be by using human labor and an implement such as tweezers.

Optionally, the row can be thermally treated for at least temporarily affecting properties of an adhesive bonding the sliver onto the row for assisting removal of the sliver.

The rows are then diced into individual read/write elements, or die. An electronic component according to one embodiment comprises a portion of a row cut from a wafer; and a closure coupled to the portion of the row of the wafer towards a first edge of the portion of the row of the wafer; the portion of the row of the wafer having a bonding area positioned adjacent a second edge of the portion of the row of the wafer, the second edge of the portion of the row of the wafer being positioned opposite the first edge of the portion of the row of the wafer and along a same side thereof, wherein the bonding area includes a layer of adhesive thereon, wherein the adhesive coupled to the bonding area is spaced from the closure. Additional systems and methods are also presented.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

BEST MODE FOR CARRYING OUT THE INVENTION

The following description is the best embodiment presently contemplated for carrying out the present invention. This description is made for the purpose of illustrating the general principles of the present invention and is not meant to limit the inventive concepts claimed herein.

The present invention provides a method and mechanism for slicing a thin film wafer to form such things as tape head components. A thin film wafer can be any type of composite or composition capable of containing circuitry therein, and includes semiconductor wafers.

Figure 4:
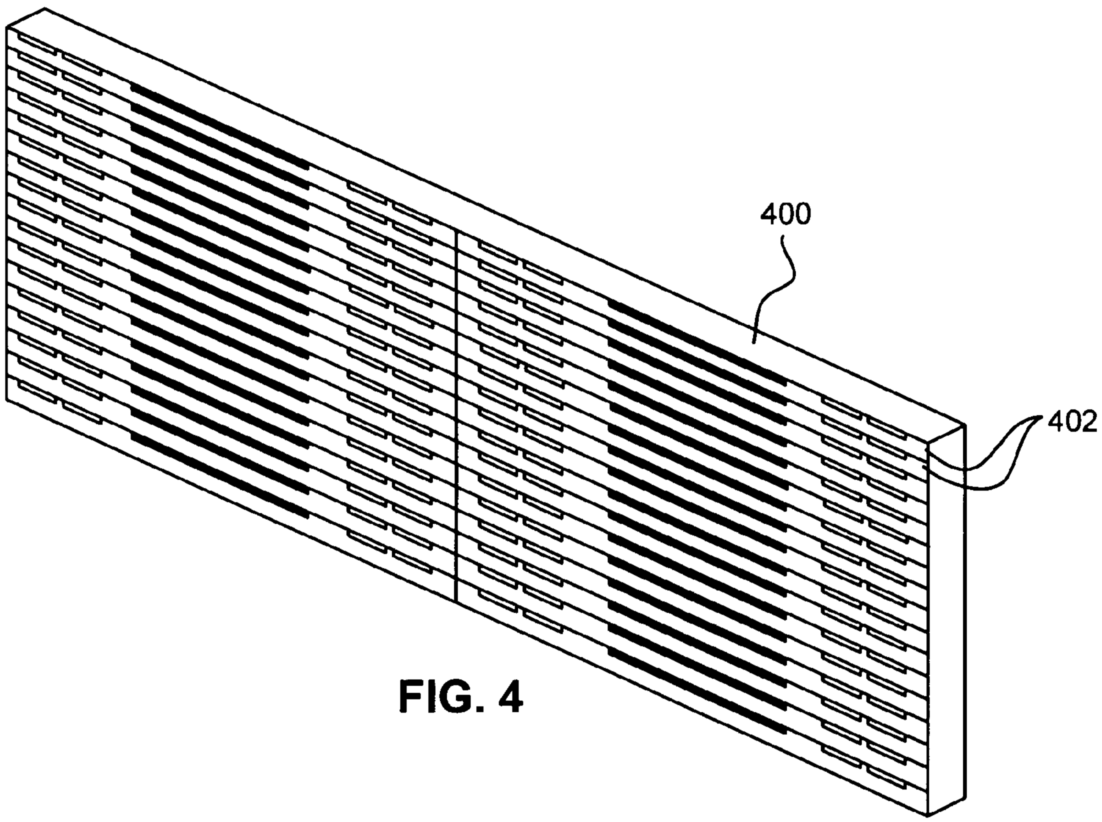
FIG. 4 is a perspective view of a section of a thin film wafer according to one embodiment.

According to the preferred method, the thin film wafer is cut into rectangular sections, sometimes called quads. FIG. 4 illustrates a section 400 of a thin film wafer according to one embodiment. As shown, the section 400 includes a plurality of rows 402 of circuitry that will eventually be sliced and diced to form die. Each row 402 can contain multiple read and/or write elements.

Figure 5:
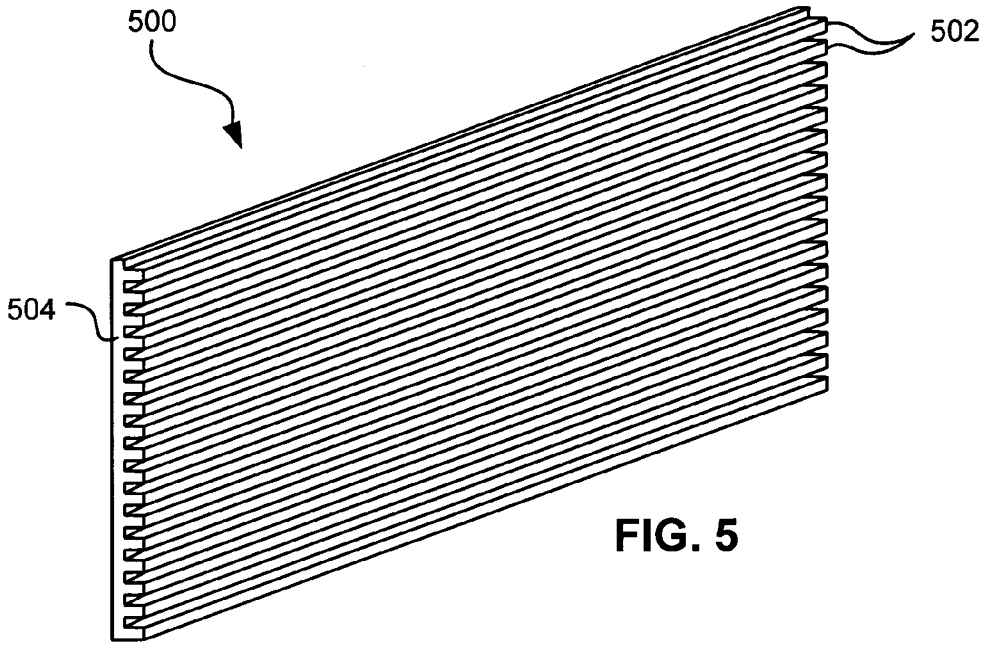
FIG. 5 is a perspective view of an array of closures.
Figure 6:
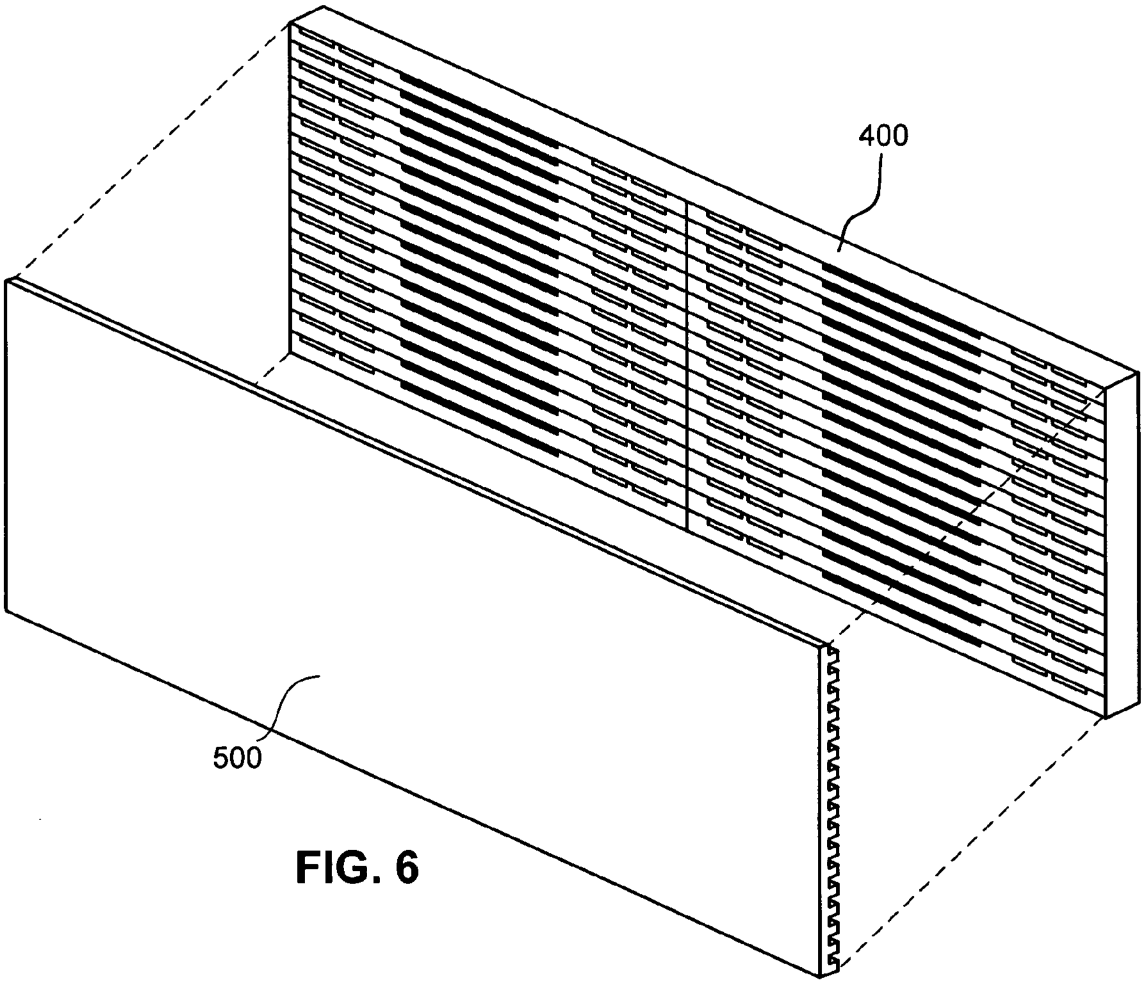
FIG. 6 is a perspective view depicting coupling of the array of closures to the section of wafer.

FIG. 5 shows an array 500 of closures 502 that will be bonded to a section 400 of the wafer. FIG. 6 illustrates how the array 500 is bonded to a section 400.

Figure 1:
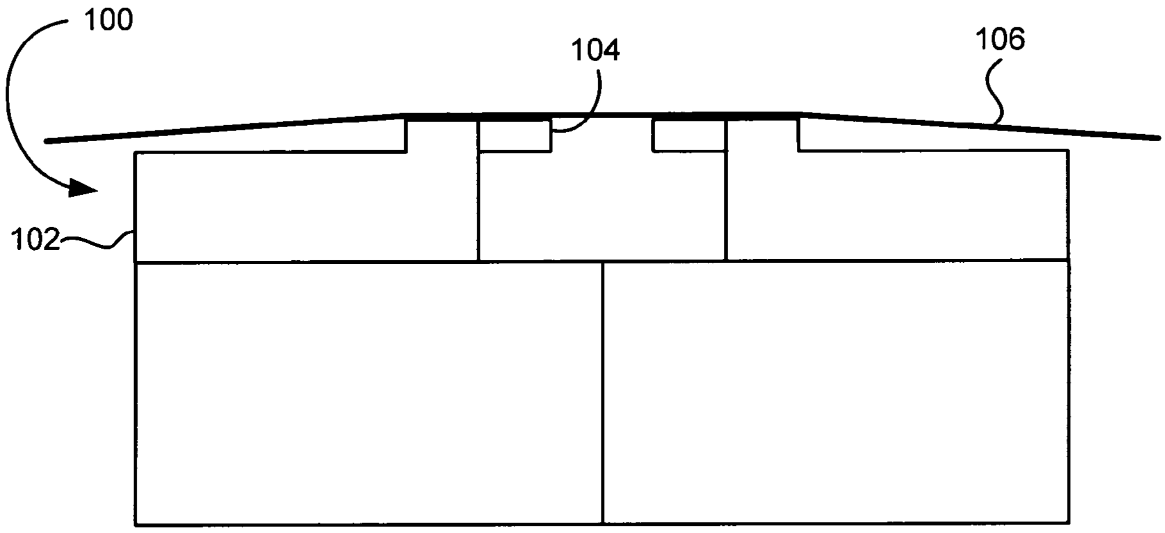
FIG. 1 is a side view of a tape head having closures.
Figure 2:
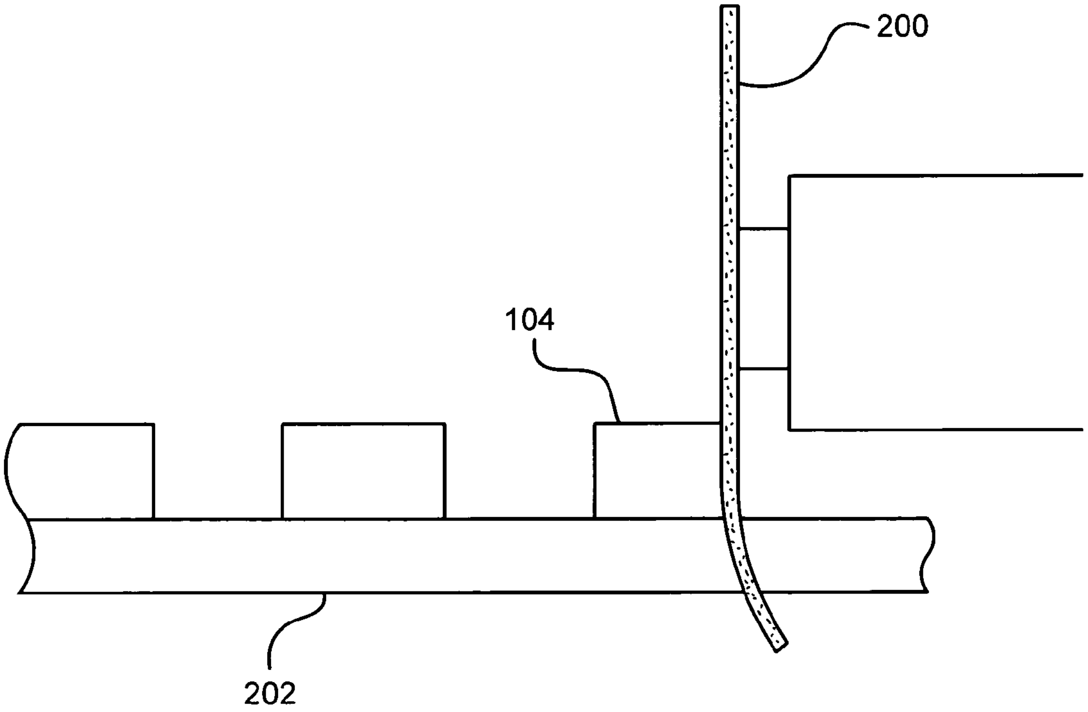
FIG. 2 is a side view of a prior art cutting process illustrating distortion of the blade.
Figure 3:
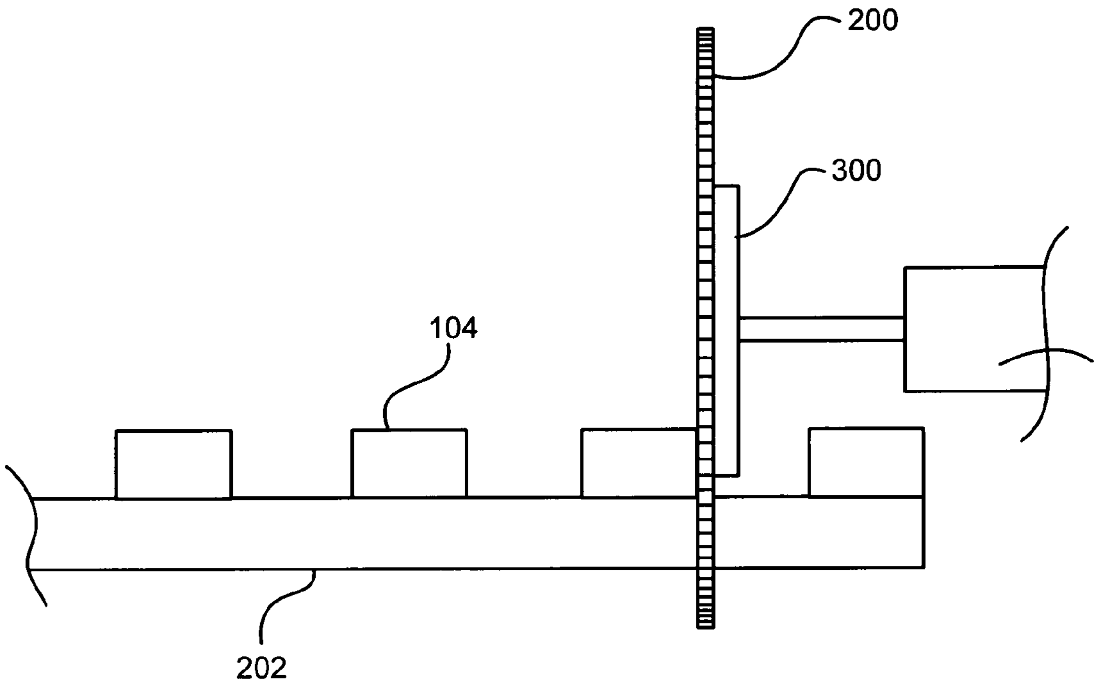
FIG. 3 is a side view of a prior art cutting process in which the blade has been reinforced to reduce blade distortion.
Figure 7:
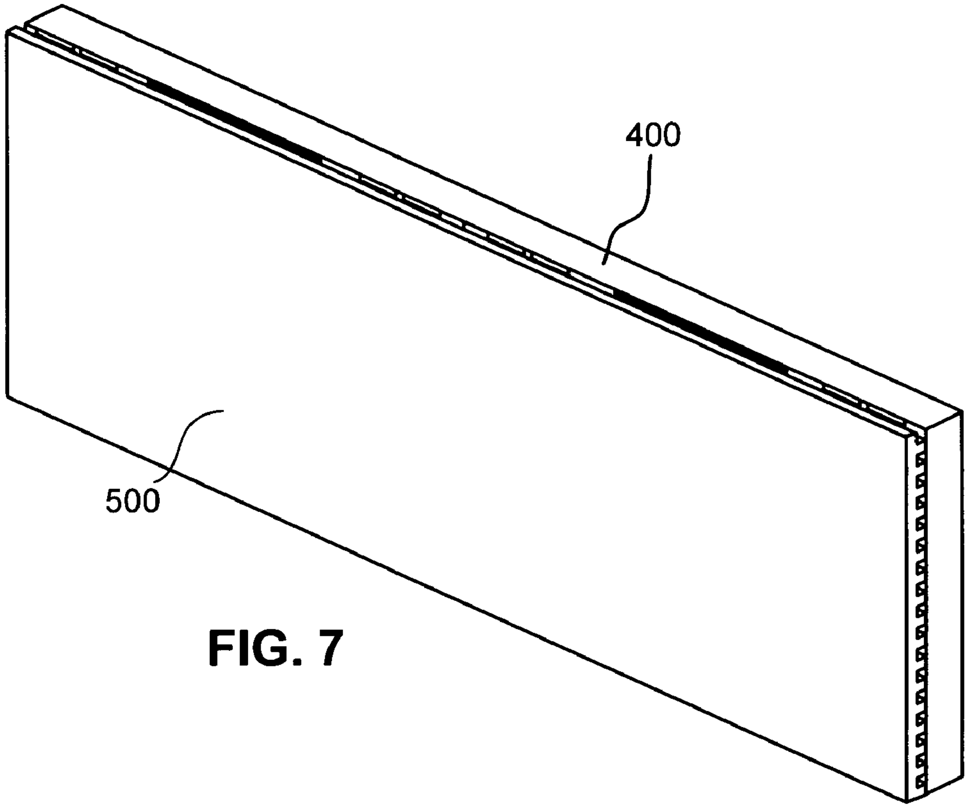
FIG. 7 is a perspective view of the array of closures coupled to the section of wafer.

FIG. 7 depicts the array 500 of closures 502 bonded to the section 400 of wafer. The portions of the closure 502 remaining after processing support the tape as the tape slides over the head to protect the delicate electronics in the head from wear, similar to the way the tape 106 engages the head 100 shown in FIG. 1.

Figure 8:
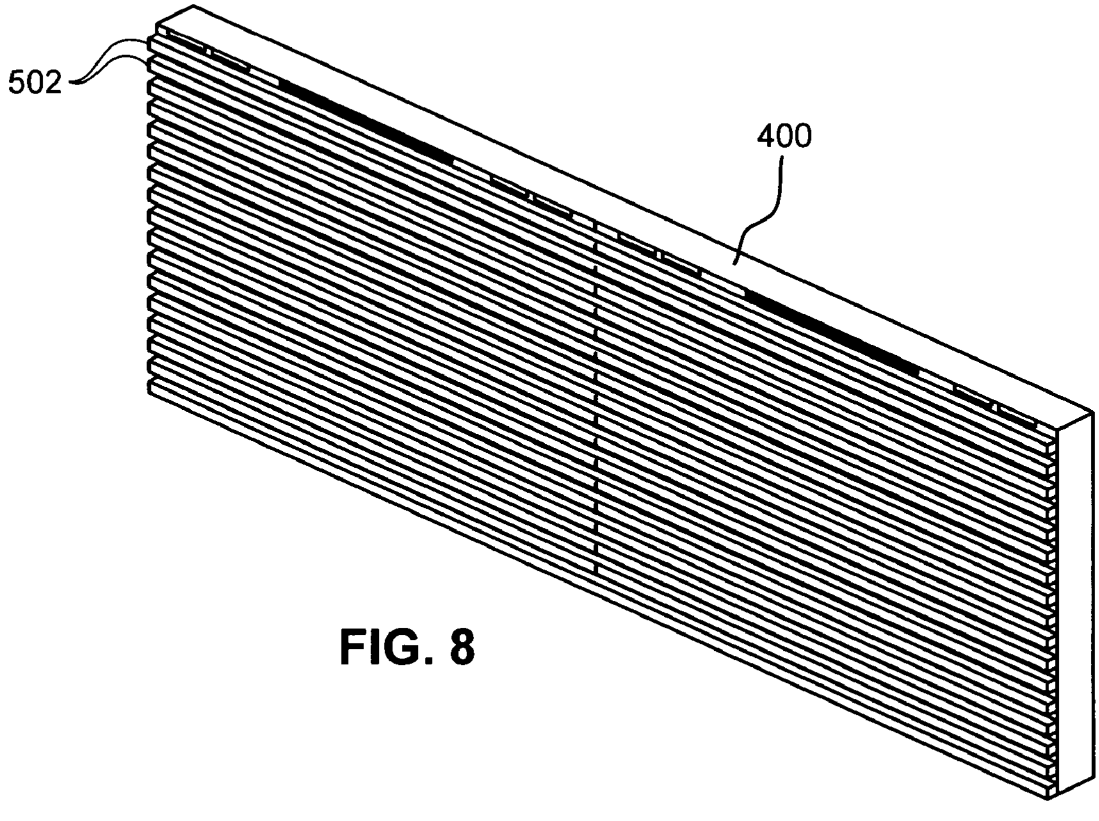
FIG. 8 is a perspective view of the closures coupled to the section of wafer upon removing a top portion of the array.

A top portion 504 of the array 500 of closures 502 may be removed prior to slicing the section 400 into rows 402. See FIG. 5. Grinding may be used to remove the top portion 504 of the array 500. FIG. 8 shows the closure 502 and section 400 with the top portion 504 of the array 500 of closures 502 removed.

Figure 9:
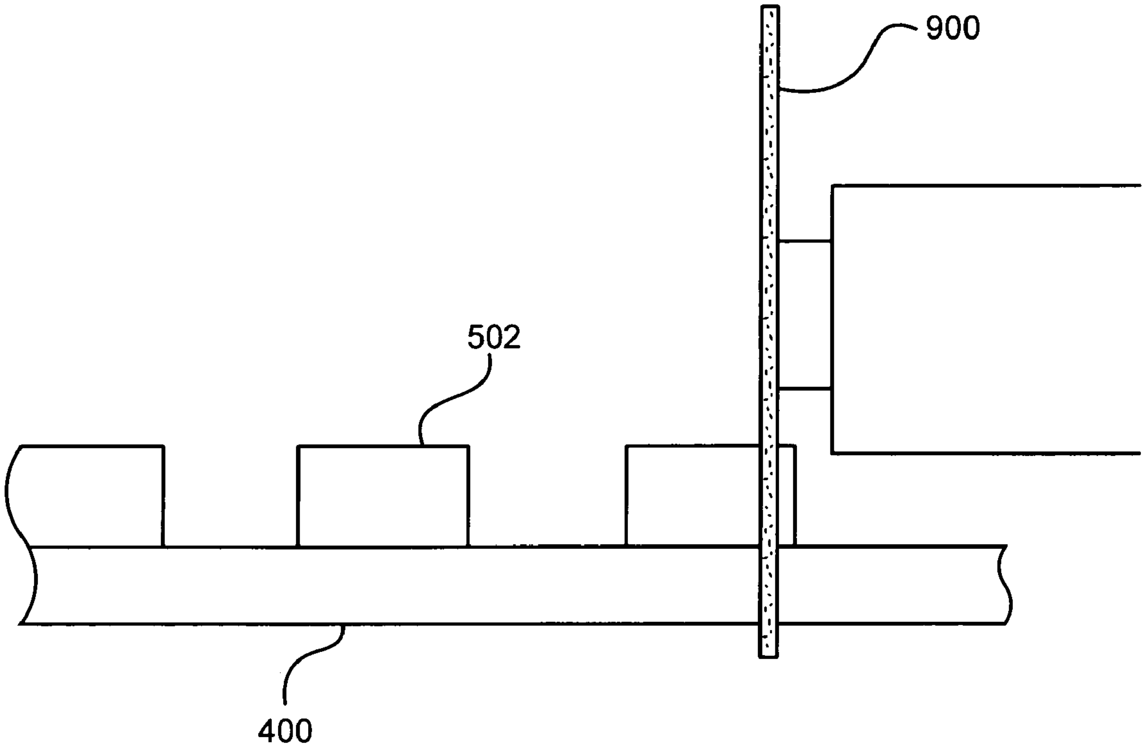
FIG. 9 is a side view depicting cutting of a row from a section of wafer.

As shown in FIG. 9, a blade 900 is used to slice rows from each section 400 by cutting through the closure 502 and section 400 such that opposite sides of the blade 900 engage an equal surface area of the closure 502. In other words, the blade 900 fully engages the closure 502.

One way to ensure that blade 900 engages equal surface areas of the closure 502 is to increase the size of the closure 502 such that the closure 502 overlaps the kerf completely. For example, if sawing is performed with a 120 micron blade 900, the closure 502 should cover about a 125 micron kerf (120 micron cutting width plus 5 microns to allow for deviation). The excess amount of closure can be removed later, as discussed below.

Another way is to use a very thin blade 900 that fully engages the closure 502. The cutting width of the blade is less than the width of the closure, where the width of the closure is defined opposite sides of the closure that are oriented generally parallel to the rotational plane of the blade. Preferably, the cutting width of the blade is less than three quarters (75%), and ideally less than one half (50%), the width of the closure. The cutting width of the blade 900 is preferably less than 150 microns, more preferably less than 100 microns, and ideally less than 75 microns. The closure 502 actually aids the blade 900 in keeping its shape because the amount of material on each side of the blade 900 is the same.

Figure 10:
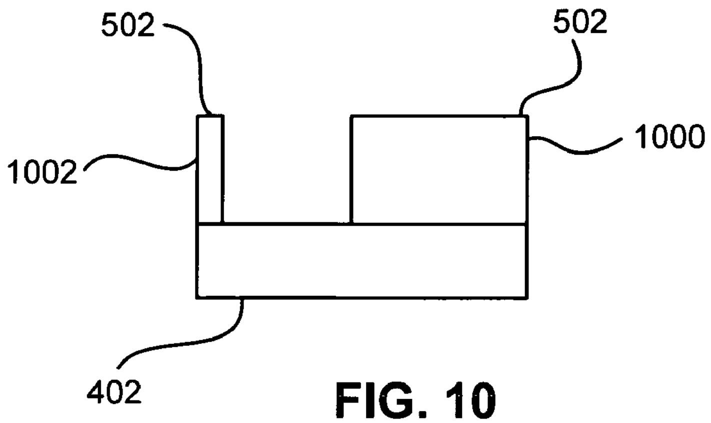
FIG. 10 is a side view of a row cut from a wafer.

FIG. 10 illustrates a row sliced from the section 400. Upon slicing, two pieces of closure material remain coupled to the row. One portion 1000 of the closure material is desired and will function to engage the tape when the row is placed in a tape head. The other portion 1002 of the closure material, referred to as a sliver 1002, is removed. The sliver 1002 can be removed by lapping. For example, the sliver 1002 may be removed during the back-lap process, which laps the sawed edge to smooth it.

The sliver 1002 can be removed mechanically, i.e., by some physical mechanism, without removing material from the row. One example would be by using human labor and an implement such as tweezers. Optionally, the row 402 can be thermally treated for at least temporarily affecting properties of an adhesive bonding the sliver 1002 onto the row 402 for assisting removal of the sliver 1002. For example, depending on the type of adhesive used to bond the closure 502 to the wafer, the temperature of the row 402 can be reduced to make the adhesive become temporarily brittle, and thereby make the sliver 1002 easier to remove. For example, if adhesive becomes brittle at temperatures below −60° C., the temperature of the row 402 can be reduced to below −60° C. prior to removing the sliver 1002.

Figure 11:
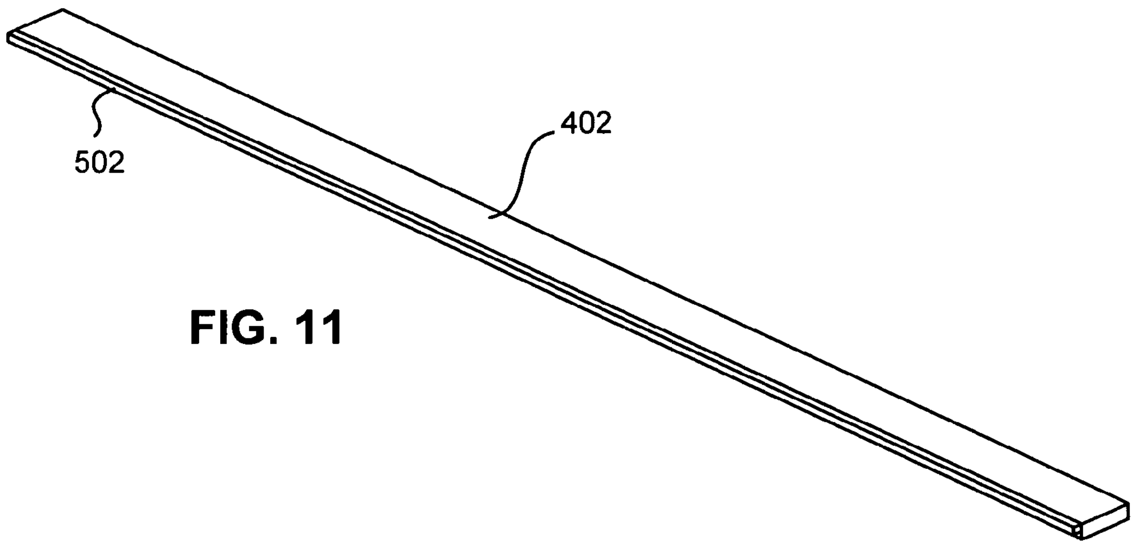
FIG. 11 is a perspective view of a row cut from a wafer.
Figure 12:
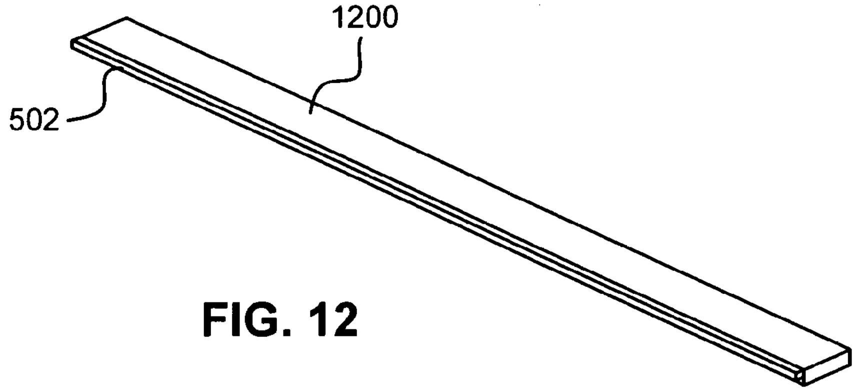
FIG. 12 is a perspective view of a dice cut from a row.
Figure 13:
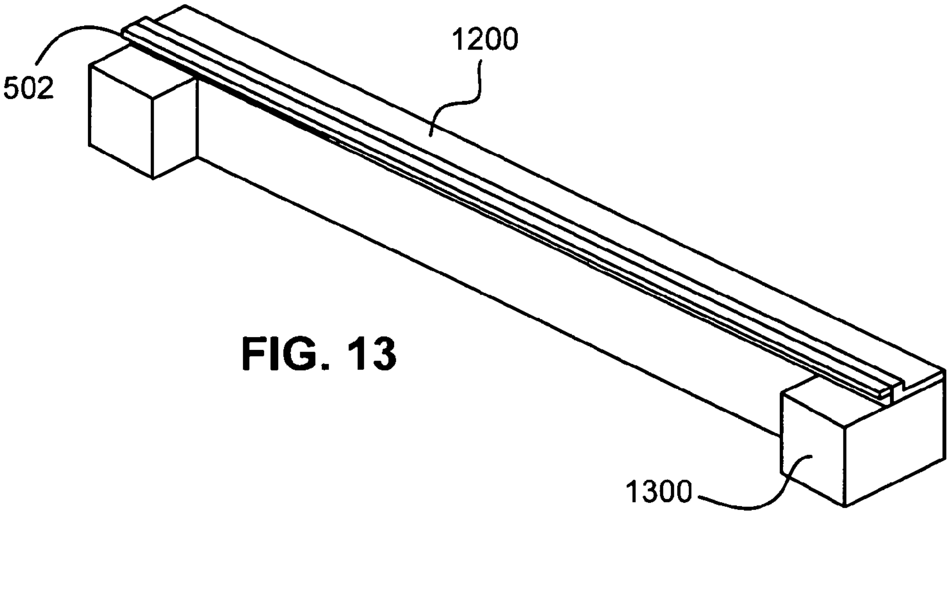
FIG. 13 is a perspective view of a dice coupled to a U-beam.

FIG. 11 shows a row after the sliver 1002 is removed. The rows are then diced into individual thin film elements, or die 1200, using traditional methods. See FIG. 12, which illustrates one dice 1200. Each dice 1200 is coupled to a U-beam 1300, as shown in FIG. 13. The U-beams 1300 are eventually coupled together to form a head.

In use, the thin film elements created by the process and instruments described herein can be used in magnetic recording heads for any type of magnetic media, including but not limited to disk media, magnetic tape, etc.

While various embodiments have been described above, it should be understood that they have been presented by way of example only, and not limitation. For example, the structures and methodologies presented herein are generic in their application to all types of thin film devices. Thus, the breadth and scope of a preferred embodiment should not be limited by any of the above-described exemplary embodiments, but should be defined only in accordance with the following claims and their equivalents.

What is claimed is:

1. An electronic component, comprising:
- a portion of a row cut from a wafer; and
- a closure coupled to the portion of the row of the wafer towards a first edge of the portion of the row of the wafer;
- the portion of the row of the wafer having a bonding area positioned adjacent a second edge of the portion of the row of the wafer, the second edge of the portion of the row of the wafer being positioned opposite the first edge of the portion of the row of the wafer and along a same side thereof, wherein the bonding area includes a layer of adhesive thereon,
- wherein the adhesive coupled to the bonding area is spaced from the closure.

2. The electronic component as recited in claim 1, wherein nothing else is bonded to the bonding area.

3. The electronic component as recited in claim 1, wherein the adhesive is a same adhesive used to couple the closure to the portion of the row of the wafer.

4. The electronic component as recited in claim 1, wherein a top portion of the closure exhibits grooves characteristic of previous grinding.

5. The electronic component as recited in claim 1, wherein the bonding area is positioned on a same surface of the portion of the row of the wafer as the closure.

6. The electronic component as recited in claim 1, wherein the bonding area is positioned on a same surface of the portion of the row of the wafer as the closure.

7. The electronic component as recited in claim 1, wherein the closure has an edge coplanar with the first edge of the portion of the row of the wafer, wherein the first edge of the portion of the row of the wafer and the edge of the closure coplanar thereto are smooth.

8. The electronic component as recited in claim 1, wherein the portion of the row of the wafer and closure form a portion of a tape head.

9. The electronic component as recited in claim 1, wherein the portion of the row of the wafer is coupled to a U-beam, the U-beam having a generally U-shaped profile.

10. A tape drive system, comprising:
- a magnetic tape; and
- a magnetic head for reading from or writing to the magnetic tape, the magnetic head including:
  - a pair of U-beams coupled together in an opposed relationship; and
  - a dice coupled to each U-beam, each dice comprising:
    - a portion of the row cut from a wafer;
    - a closure coupled to the portion of the row of the wafer along a first edge of the portion of the row of the wafer, the first edge being positioned towards a tape bearing surface of the portion of the row of the wafer; and
  - the portion of the row of the wafer having a bonding area positioned towards a second edge of the portion of the row of the wafer, the second edge of the portion of the row of the wafer being positioned opposite the first edge of the portion of the row of the wafer, the second edge being positioned away from the tape bearing surface of the portion of the row of the wafer, wherein the bonding area includes a layer of adhesive thereon,
  - wherein the adhesive coupled to the bonding area is spaced from the closure.

* * * * *